United States Patent
Lembacher et al.

(10) Patent No.: US 10,602,247 B2
(45) Date of Patent: Mar. 24, 2020

(54) LOUDSPEAKER WITH METALLIC ORGANIC FRAMEWORK MATERIAL

(71) Applicant: Sound Solutions International Co., Ltd., Beijing (CN)

(72) Inventors: Christian Lembacher, Gramatneusiedl (AT); Christoph Schmauder, Vienna (AT)

(73) Assignee: SSI New Material (Zhenjiang) Co., Ltd., Zhenjiang (CN)

( * ) Notice: Subject to any disclaimer, the term of this patent is extended or adjusted under 35 U.S.C. 154(b) by 0 days.

(21) Appl. No.: 16/105,526

(22) Filed: Aug. 20, 2018

(65) Prior Publication Data
US 2019/0058935 A1 Feb. 21, 2019

(30) Foreign Application Priority Data
Aug. 21, 2017 (AT) .............................. A 50695/2017

(51) Int. Cl.
| H04R 1/02 | (2006.01) |
| G06F 1/16 | (2006.01) |
| H04R 1/28 | (2006.01) |
| H04R 9/06 | (2006.01) |

(52) U.S. Cl.
CPC ........... *H04R 1/025* (2013.01); *G06F 1/1688* (2013.01); *H04R 1/288* (2013.01); *H04R 9/063* (2013.01); *H04R 1/021* (2013.01); *H04R 2499/11* (2013.01)

(58) Field of Classification Search
CPC .... H04R 1/02; H04R 9/06; H04R 1/28; G06F 1/16

USPC ....... 381/337, 354, 191, 333, 182, 190, 398, 381/396, 412, 309, 371
See application file for complete search history.

(56) References Cited

U.S. PATENT DOCUMENTS

| 9,924,275 B2 | 3/2018 | Pinkerton et al. |
| 2010/0034411 A1 | 2/2010 | Mellow et al. |
| 2010/0142741 A1 | 6/2010 | Plummer |
| 2017/0041703 A1* | 2/2017 | Herold .................. H04R 1/288 |
| 2017/0359649 A1* | 12/2017 | Choi ..................... H04R 31/00 |

FOREIGN PATENT DOCUMENTS

| CN | 1020560581 A | 5/2011 | |
| CN | 106875934 A * | 6/2017 | |
| CN | 106875934 A | 6/2017 | |
| CN | 107426646 A | 12/2017 | |
| GB | 2513986 A * | 11/2014 | ............... H04R 1/02 |
| GB | 2513986 A | 11/2014 | |

OTHER PUBLICATIONS

Office Action dated Jun. 26, 2018 for counterpart Austrian Patent Application A50695/2017.
First Office Action for counterpart Chinese patent application No. 201810952760.0, dated Jul. 30, 2019.
Search Report for counterpart Chinese patent application No. 201810952760.0, dated Jul. 30, 2019.

* cited by examiner

*Primary Examiner* — Melur Ramakrishnaiah
(74) *Attorney, Agent, or Firm* — Steven McMahon Zeller; Dykema Gossett PLLC

(57) ABSTRACT

A loudspeaker, comprising an enclosure; at least one dynamic driver mounted in the enclosure; and a porous sound adsorber material disposed within the enclosure, the sound adsorber material at least comprising a Metallic Organic Framework material.

5 Claims, 3 Drawing Sheets

LOUDSPEAKER WITH METALLIC ORGANIC FRAMEWORK MATERIAL

PRIORITY

This patent application claims priority from Austrian Patent Application No. A50695/2017, filed on Aug. 21, 2017, the disclosure of which is incorporated herein, in its entirety, by reference.

BACKGROUND OF THE INVENTION a. Field of the Invention

The invention relates to a loudspeaker and to a method of manufacturing a loudspeaker. The invention also relates to a mobile device, such as a mobile phone, comprising a loudspeaker.

b. Related Prior Art

European patent No. 2 424 270 B1 discloses a loudspeaker which comprises an enclosure and a dynamic driver mounted in the enclosure. The enclosure is filled with a zeolite material. Filling the enclosure with the zeolite material results in in an apparent virtual enlargement of the volume defined by the enclosure, i.e. results in increasing the effective volume of the enclosure. The zeolite material comprises grains having an average grain size in a range between 0.2 and 0.9 mm and having a plurality of zeolite particles adhered together by means of a binder.

SUMMARY OF THE INVENTION

It is an object of the present invention to provide a loudspeaker comprised of an enclosure and a dynamic driver mounted in the enclosure, which loudspeaker comprises increased acoustic properties.

The object of the invention is achieved by means of a loudspeaker, comprising an enclosure; and a porous sound adsorber material disposed within the enclosure, the sound adsorber material at least comprising a Metallic Organic Framework material.

It has been found that the use of a Metallic Organic Framework material (MOF) is beneficial for acoustic effect. Due to different material characteristics such as mass density compared to other materials such as zeolite materials the acoustic properties of the loudspeaker are increased very much by the use MOF materials.

By means of the invention the Sound Pressure Level SPL can be increased in certain frequency bands. Therefore, the customer specification can be fulfilled more easily and the time to market can be reduced. In particular, the way of processing the material according to the invention allows better usage of the effect of increasing the acoustic volume and/or acoustic compliance respectively in small cavities and back volumes.

Another aspect of the invention relates to a mobile device comprising a loudspeaker according to the invention. The mobile device is, for instance, a mobile telephone.

The loudspeaker comprises the enclosure. The enclosure is preferably a sealed enclosure. Sealed loudspeaker enclosures are also referred to as closed enclosures.

The loudspeaker comprises at least one dynamic driver. Dynamic drivers per se are known to the skilled person. Dynamic drivers usually comprise a magnet system, a membrane movably mounted with respect to the magnet system, and a voice coil attached to the membrane. The magnet system comprises a magnet and the voice coil is operatively coupled with the magnet. When applying an electric signal to the voice coil, for instance, generated by an amplifier, then the membrane moves in response to the electric signal. The electric signal is, for instance, an electric voltage.

The enclosure provides a volume, specifically a back volume constituting a resonance space for the dynamic driver.

The loudspeaker further comprises the sound adsorber material. The sound adsorber material is preferably placed within the back volume for the dynamic driver. Preferably the at least one resonance space is tightly filled with the material.

According to an embodiment the Metallic Organic Framework material can comprise individual Metallic Organic Framework particles.

The sound adsorber material can comprise a binder adhering the individual Metallic Organic Framework particles together.

Furthermore, the sound adsorber material may constitute a foam of predefined shape.

According to an embodiment the sound adsorber material may constitute a porous monolithic block.

The sound adsorber material can be a pouch of predefined shape, the pad comprising a cover-material being at least partially permeable to air, the cover-material filled with a powder of individual Metallic Organic Framework particles.

The sound adsorber material can constitute a granulate comprising grains, each grain having a plurality of the Metallic Organic Framework particles adhered together with the binder.

The grains can have a size between 50 µm-1.33 mm.

According to an embodiment the adsorber material can comprise pores having a diameter between 0.7 µm to 30 µm.

The particles of the Metallic Organic Framework material can have diameters between 2 µm-10 µm.

DESCRIPTION OF THE PREFERRED EMBODIMENTS

Figure 1:
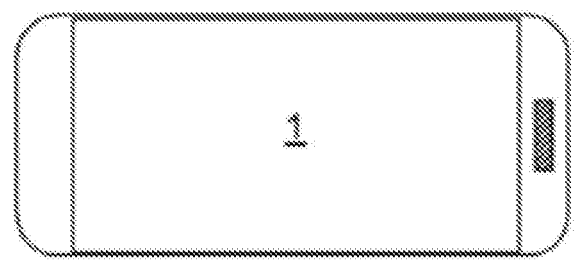
FIG. 1 is a top view of a mobile phone.

FIG. 1 shows a mobile phone 1 as an example of a mobile device. The mobile phone 1 may comprise a microphone, a wireless sender-receiver unit, an amplifier and a central processing unit connected to the wireless sender-receiver unit and to the amplifier.

Figure 2:
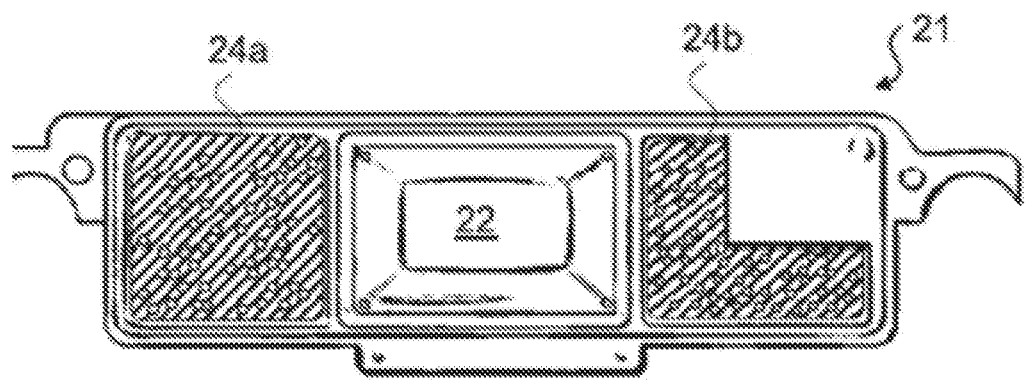
FIG. 2 is a top view of a loudspeaker comprising monolithic blocks, a dynamic driver and an enclosure which is shown open.

The mobile device 1 comprises a loudspeaker 21 which is shown in FIG. 2. The amplifier of the mobile phone 1 may be connected to the loudspeaker 21.

The loudspeaker 21 comprises at least one dynamic driver 22. Dynamic drivers per se are known to the skilled person. Dynamic drivers usually comprise a magnet system, a membrane movably mounted with respect to the magnet system, and a voice coil attached to the membrane. The magnet system comprises a magnet and the voice coil is operatively coupled with the magnet. When applying an electric signal to the voice coil, for instance, generated by the amplifier, then the membrane moves in response to the electric signal.

The loudspeaker 21 comprises an enclosure 23 and a porous sound adsorber material mounted within the enclosure 23.

The sound adsorber material comprises a MOF material, e.g. selected from the group of MOF-5, MOF-177, HKUST-1, MIL-53 (Al), BAF-4, MFU-1, DUT-67 (Zr), MIL-100 (Fe), DUT-4, DUT-5, UiO-67, MIL-101(Al)—NH2, MIL-100 (Al), MIL-101(Cr), ZIF-8, MIL-110 (Al), UiO-66 and MIL-125(Ti)—NH2.

In an embodiment the sound adsorber material may comprise porous MOF particles and a binder. The porous MOF particles may be embedded in the binder. According to an embodiment the binder may comprise a solid content of at least 30 percent by weight with regard to the total weight of the binder. Preferably, the binder has a solid content between 50 and 90 percent by weight with regard to the total weight of the binder. According to an embodiment the binder has a solid content between 55 and 75 percent by weight with regard to the total weight of the binder.

In particular, the loudspeaker 21 comprises a first MOF-material 24a comprising porous particles and a second MOF-material 24b comprising porous particles. The MOF-materials 24a and 24b are of the same chemical structure. The MOF-materials 24a and 24b each may be in the form of a granulate or of a porous monolithic block.

According to a preferred embodiment the binder comprises at least one Sodium-Carboxymethylcellulose [CAS: 9004-32-4] and/or at least one poly carbon acid and/or at least one acrylate and/or at least one acrylate-polymer or at least one acrylate-copolymer, and/or Bentonite [CAS: 1302-78-9] and/or Glycerin [CAS.: 56-81-5] and/or Ethylene-Glycol [CAS.: 107-21-1]. The CAS-terms in the brackets refer to the numerical CAS identifier assigned by the Chemical Abstracts Service (CAS).

Sodium-Carboxymethylcellulose (CMC) [CAS: 9004-32-4] is a good binder, which gives relatively hard materials and good acoustic properties. Alternatively also a commercial available binder from company Zschimmer and Schwarz, named Optapix AC15 (this is a poly carbon acid mixture) can be used and also gives very good acoustic results. Also combinations of binder can be used to achieve a certain hardness. For example Bentonit [CAS: 1302-78-9] gives very hard granules. On the other hand the previously mentioned granulates prepared with CMC are softer. Therefore to obtain a certain hardness different binder can be used to obtain a certain property profile. Alternatively CMC can be mixed with Glycerin [CAS.: 56-81-5] or Ethylenglykol [CAS.: 107-21-1] to obtain a more softer granulate. An Amount of Glycerin or Ethylenglykol is typically 1 m % of remaining binder such as CMC. According to an further embodiment the binder can comprise a methacrylic ester-acrylic ester copolymer.

The binder may be a radiation curing binder. In an embodiment the binder is a solvent based binder, wherein curing is performed by evaporation of a solvent.

In relation to the whole mass of the material the mass fraction of the binder may be in the range from 1% to 20%. According to a further embodiment, in relation to the whole mass of the material the mass fraction of the binder is in the range from 2% to 10%. According to a further embodiment, in relation to the whole mass of the material the mass fraction of the binder is in the range from 4% to 6%.

Figure 3:
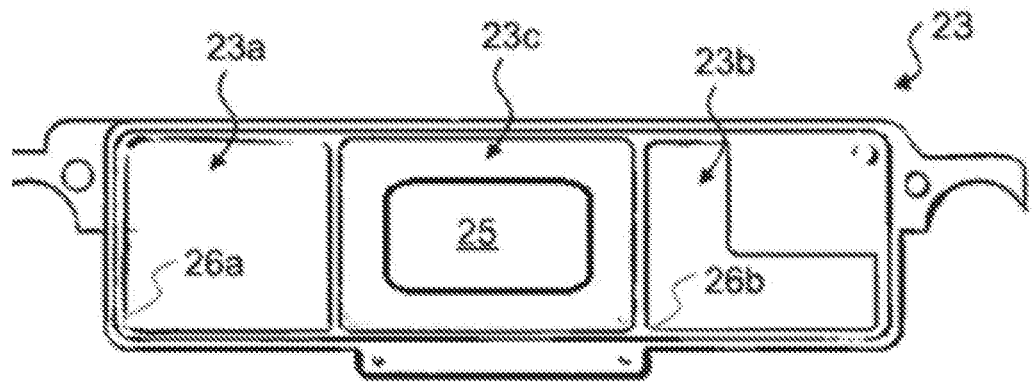
FIG. 3 is a top view of the opened enclosure.
Figure 4:
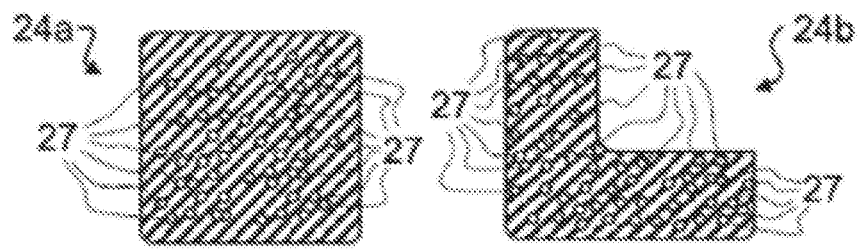
FIG. 4 are monolithic blocks.

FIG. 2 shows in particular a top view of the of the loudspeaker 21 with its enclosure 23 opened. FIG. 3 shows a top view of the opened enclosure 23 and FIG. 4 shows the materials 24a, 24b.

In the present embodiment, the enclosure 23 comprises a plurality of sub-enclosures, namely a first sub-enclosure 23a, a second sub-enclosure 23b, and a third sub-enclosure 23c. The sub-enclosures 23a, 23b, 23c are acoustically coupled to each other and form, as a result, the single enclosure 23 for the dynamic driver 22.

In the present embodiment, the enclosure 23 is a sealed enclosure. Sealed enclosures are also known as closed enclosures.

The dynamic driver 22 is mounted in the third sub-enclosure 23c. In particular, the third sub-enclosure 23c comprises an aperture 25 in which the dynamic driver 22 is mounted.

The materials 24a, 24b are mounted within the enclosure 23. In the present embodiment, the first material 24a is mounted within the first sub-enclosure 23a, and the second material 24b is mounted within the second sub-enclosure 23b.

The first and second sub-enclosures 23a, 23b may be identical or, as shown in the figures, may differ from each other.

In case the materials 24a, 24b are in the form of porous monolithic blocks each of these blocks comprises pores 27. Particularly, the first pores 27 have a diameter between 0.7 µm to 30 µm.

Alternatively, the materials 24a, 24b may be granules consisting of a plurality of individual grains having a grain size between 50 µm-1.33 mm.

The granulate may be produced by providing a plurality of porous particles and the binder. Then, the binder and the plurality of particles are mixed together resulting in a particle-binder mixture. The particle-binder mixture is then processed to obtain grains of a desired diameter.

The particle-binder mixture can be of a liquid form, e.g. a slurry, suspension etc. The slurry or suspension may be obtained by (a) preparing a porous particle (MOF or another appropriate material) suspension with an organic solvent, e.g. alcohol, wherein the porous particles have a mean particle diameter smaller than 10 µm or, according to another embodiment, smaller than 2 µm. (b) The porous particle suspension is homogenized, e.g. by stirring. (c) Then homogenized porous particle suspension is mixed with a binder suspension.

According to an embodiment solid content of the binder and the porous MOF particles having the form of powders may be mixed and afterwards a solvent may be added to a resulting mixture of these components to obtain a slurry.

Processing of the particle-binder mixture can be done by means of drying. Drying can be performed in different ways, e.g. by means of a fluidized bed, a spray method (drops of the mixture may be freeze dried) or by pouring the resultant suspension onto a hot plate (according to embodiments the temperature of the plate range is in a range between 120 degrees Celsius and 200 degrees Celsius or between 150 degrees Celsius and 170 degrees Celsius).

According to an embodiment the particle-binder mixture is filled into a drum and the granulate is produced by rotating the drum. The drum may be heated to enhance drying and curing of the particle-binder mixture.

If the grains of the resultant solid are larger than desired, the resultant solid may be cut or broken into smaller pieces e.g. by means of a mortar mill, a hammer rotor mill, a cutting mill or a oscillating plate mill. (d) Subsequently, the resultant solid (optionally cut or broken) is screened with sieves to obtain grains in a desired diameter range.

Due to the material 24a, 24b, the effective acoustic volume of the enclosure 23 is greater than the volume of the enclosure 23 without the material 24a, 24b.

Figure 5:
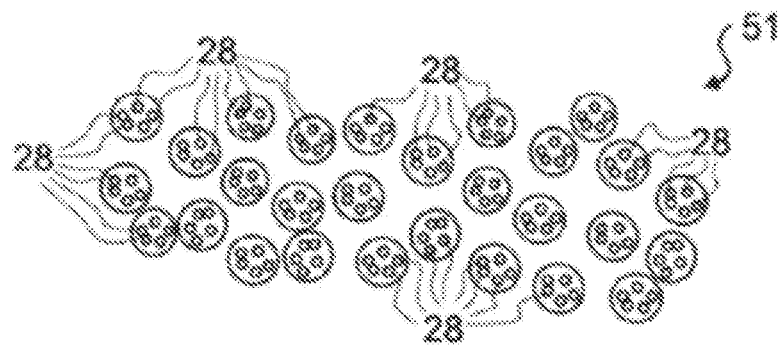
FIG. 5 is a plurality of particles.

In case the materials 24a, 24b are in form of porous monolithic blocks the material may be produced using a freezing casting method using a plurality of particles 51 shown in FIG. 5. The particles 51 may already be grains consisting of porous MOF particles and the binder. Alternatively, the materials 24a, 24b may be produced by a freezing foaming method using the plurality of particles 51, a sintering method using the plurality of MOF particles 51, a ceramic foaming method using the plurality of particles 51, or a self-curing binding technique using the plurality of particles 51.

Figure 6:
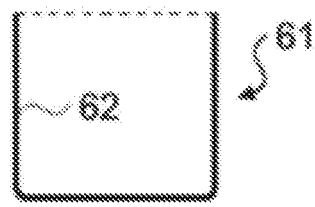
FIG. 6 is a mold.

For the aforementioned methods, an appropriate mold 61, as shown in FIG. 6, may be used. Particularly, the mold 61 is made from a material appropriate for the specific method. In particular, each porous monolithic block 24a, 24b may be made utilizing an individual mold 61.

For instance, if the porous monolithic blocks are made utilizing the freezing casting method, then the mold 61 may at least partly be made from PTFE (Polytetrafluorethylen).

For instance, if the porous monolithic blocks are made utilizing a foaming method, e.g. the freezing foaming method, then the mold 61 may at least partly be made from silicon rubber. If a foaming method, e.g. the freezing foaming method, is applied the resulting monolithic block constitutes a solid foam.

In the present embodiment, the shape of the first and second sub-enclosures 23a, 23b differ.

In particular, the shape of the porous monolithic block 24a, 24b are adapted to the shape of the relevant sub-enclosures 23a, 23b, i.e. the shape of the first porous monolithic block 24a is adapted to the shape of the first sub-enclosure 23a, and the shape of the second porous monolithic block is adapted to the shape of the second sub-enclosure 23b. When using one of the aforementioned methods to produce the porous monolithic blocks, then, for instance, the mold 61 can be adapted to the shape of the relevant sub-enclosure 23a, 23b.

The enclosure 23 may have a contour. More specifically, the surface of the enclosure 23 facing towards the porous monolithic blocks 24a, 24b may have the contour. Preferably, the porous monolithic blocks 24a, 24b are mounted into the enclosure 23 in a form-fit manner corresponding to the contour of the enclosure 23.

In the present embodiment, the first sub-enclosure 23a has a first contour 26a and the second sub-enclosure 23b has a second contour 26b. Preferably, the first monolithic block is mounted into the first sub-enclosure 23a in a form-fit manner corresponding to the first contour 26a of the first sub-enclosure 23a, and the second monolithic block is mounted into the second sub-enclosure 23b in a form-fit manner corresponding to the second contour 26b of the second sub-enclosure 23b.

When using one of the aforementioned methods to produce the porous monolithic blocks, then, for instance, each porous monolithic block 34a, 24b is made using its specific mold 61. These molds 61 may preferably each have a contour 62 which corresponds to the contour 26a, 26b of the relevant sub-enclosure 23a, 23b.

Figure 7:
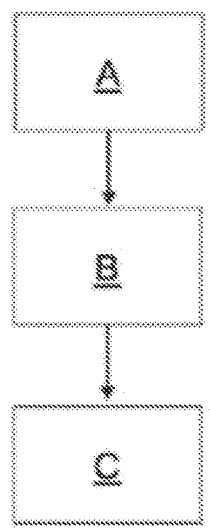
FIG. 7 is a flow chart.

FIG. 7 summarize, by means of a flow chart, embodiments how to manufacture the loudspeaker 21 and the mobile phone 1, respectively.

For manufacturing the loudspeaker 21 or the mobile device 1, the plurality of porous particles may be provided, step A of the flow chart.

Then, the materials 24a, 24b are produced by mixing the plurality of particles and the binder and producing a granulate or a porous block, step B of the flow chart, particularly by means of one of the aforementioned methods.

Then, the materials 24a, 24b are mounted into the enclosure 23, particularly into the first and second sub-enclosures 23a, 23b, step C of the flow chart. Preferably, the sub-enclosures are tightly filled with the materials 24a, 24b.

If utilizing, for instance, for producing a granulate, a spray method, then the materials 24a, 24b may be made by providing the plurality of porous particles, the binder, a nozzle and a freezer. Then, the binder and the plurality of particles 51 may be mixed and this mixture may be sprayed though the nozzle and frozen. By means of this a granulate consisting of grains of desired diameters can be achieved.

If utilizing, for instance, for producing a granulate, a method using a drum, then the materials 24a, 24b may be made by providing the plurality of porous particles, the binder and a drum. Then, the binder and the plurality of particles 51 may be mixed in the rotating drum to obtain a granulate with grains of desired diameter.

It should be mentioned that all methods known in the art to produce a granulate can in principle be used for the present purpose.

If utilizing, for instance, for producing a monolithic porous block the freezing casting method, then the materials 24a, 24b may be made by providing the plurality of porous particles, the binder and the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the mold 61 filled with the mixture of the plurality of particles 51 and the binder is frozen in order to produce the relevant material 24a, 24b. Then, the mold 61 is removed from the material 24a, 24b.

If utilizing, for instance, for producing a monolithic porous block the freezing foaming method, then the material may be made by providing the plurality of porous particles, the binder, the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the ambient pressure around the mold 61 filled with the mixture of the plurality of particles 51 and the binder is reduced in order to produce the relevant porous material 24a, 24b. Then, the mold 61 is removed from the porous material 24a, 24b.

If utilizing, for instance, for producing a monolithic porous block the sintering method, then the porous material 24a, 24b may be made by providing the plurality of porous particles, the binder, and the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the mold 61 filled with the mixture of the plurality of particles 51 and the binder is heated in order to produce the relevant material 24a, 24b. During the heating, the binder burns at least partially. For example, two different kinds of binders may be used. One type of binder is a temporary binder which burns during the heating creating the first pores 27. Another type of binder may not burn during the heating. Then, the mold 61 is removed from the material 24a, 24b. Alternatively, the foaming of the plurality of particles 51 can also be achieved by a ceramic foaming method.

If utilizing, for instance, the self-curing binding method, then the material blocks 24a, 24b may be made by providing a protein foam as a structuring agent, the plurality of porous particles, the binder, and the mold 61 whose contour 62 corresponds to the contour 26a, 26b of the first and second sub-enclosure 23a, 23b. Then, the protein foam, the binder and the plurality of particles 51 may be mixed and this mixture may be filled into the mold 61. Then, one has to wait until the mixture filled into the mold 61 self-cures in order to produce the relevant porous material 24a, 24b. Then, the mold 61 is removed from the material 24a, 24b.

Figure 8:
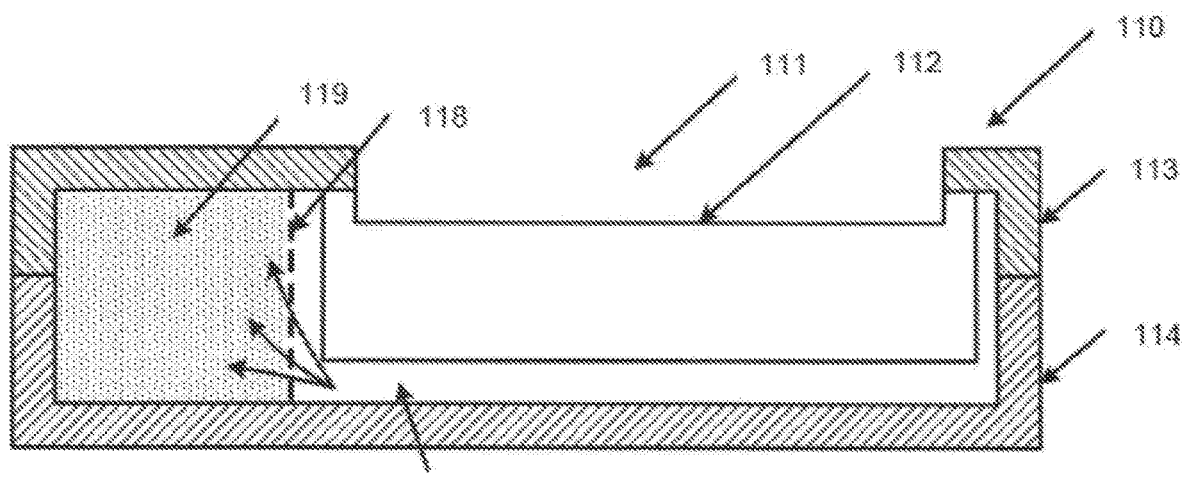
FIG. 8 is another embodiment of the present invention.

Referring to FIG. 8, one method of packaging the sound adsorber material 819 is illustrated. As shown in FIG. 8 along section line A-A, the back volume 817 of the loudspeaker device 810 extends around the acoustic transducer 812 and into the internal portion of the back volume where the sound adsorber pouch 816 is disposed. A technique of using a pouch to enclose the sound adsorber material 819 is disclosed in U.S. application Ser. No. 14/003,217, which is incorporated by reference in its entirety into this disclosure. As disclosed in application Ser. No. 14/003,217, the sound adsorber pouch 816 is manufactured to fit within the internal contours of the back volume, and one side of the sound adsorber pouch 816 comprises a gas permeable material having a low acoustic resistance that facilitates gas exchange between the back volume and the interior volume of the sound adsorber pouch 816. The gas permeable material must also retain the MOF material 819, which may have the form of a powder consisting of MOF particles, within the interior chamber of the pouch. The remaining sides of the sound adsorber pouch 816 are manufactured from a material that is relatively impermeable to gas, or has a high acoustic resistance. The sound adsorber pouch 816 is positioned such that gas exchange occurs between the sound adsorber material 819 and the back volume 817 through the permeable material.

Alternatively, the sound adsorber material being in powder, particle, or granulate form may be filled directly into the back volume 817. In the latter case the adsorber material may have a slit back volume, wherein the size of the slits is smaller than the diameter of the particles or granulates.

Although modifications and changes may be suggested by those skilled in the art, it is the intention of the invention to embody within the patent warranted hereon all changes and modifications as reasonably and properly come within the scope of his contribution to the art.

What is claimed is:

1. A loudspeaker, comprising
an enclosure;
at least one dynamic driver mounted in the enclosure; and
a porous sound adsorber material disposed within the enclosure, the sound adsorber material at least comprising a Metallic Organic Framework material,
wherein the Metallic Organic Framework material comprises individual Metallic Organic Framework particles, the sound adsorber material comprises a binder adhering the individual Metallic Organic Framework particles together, the sound adsorber material constitutes a granulate comprising grains, each grain having a plurality of the Metallic Organic Framework particles adhered together with the binder.

2. The loudspeaker of claim 1, the grains having a size between 50 µm-1.33 mm.

3. The loudspeaker of claim 1, the adsorber material comprising pores having a diameter between 0.7 µm to 30 µm.

4. The loudspeaker of claim 1, the particles of the Metallic Organic Framework material having diameters between 2 µm-10 µm.

5. The loudspeaker of claim 1, wherein the porous sound adsorber material has a slit back volume, the porous sound adsorber material is filled directly into the slit back volume, wherein a size of slits is smaller than a diameter of the granulate.

* * * * *